10

United States Patent Office 3,287,354
Patented Nov. 22, 1966

3,287,354
PREPARATION OF DIAZIRINES FROM CARBONYLS
Julius J. Fuchs, Wilmington, Del., assignor to E. I. du Pont de Nemours and Company, Wilmington, Del., a corporation of Delaware
No Drawing. Filed Oct. 8, 1964, Ser. No. 402,639
3 Claims. (Cl. 260—239)

This invention relates to cyclic diazo compounds and more particularly, this invention relates to diazirine compounds of the following formula and to their preparation:

(1) 

wherein $R_1$ is alkyl of 1 through 16 carbon atoms or phenyl;
$R_2$ is hydrogen or $$\begin{array}{c} CH-R_3 \\ | \\ R_4 \end{array}$$

wherein $R_3$ is hydrogen or alkyl of 1 through 15 carbon atoms; and $R_4$ is hydrogen or methyl; provided that $R_1$ and $R_2$ can be taken together and are of the following formulae:

(2) 

wherein $n$ is a positive integer more than 1 and less than 15;

(3) 

(4) 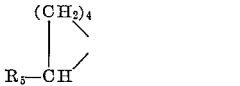

(5) 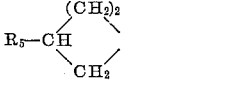

(6) 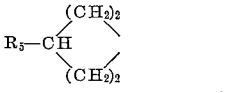

wherein $R_5$ is alkyl of 1 through 4 carbon atoms or alkoxy of 1 through 4 carbon atoms; with the limitation that there be no more than a total of 18 carbon atoms in the diazirine.

Such compounds as dimethyldiazirine, diethyldiazirine, and di-n-propyldiazirine have been prepared in the past by a two-step process wherein the diaziridine is first prepared and isolated and then is dehydrogenated to the corresponding diazirine. See, for example, Cyclic Diazo Compounds, Chem. Ber. 94, pp. 2166–2173 (1961) by Ernest Schmitz and Roland Ohme, and 3,3-Dialkyl-Di-azocyclopropene-(1), Angewandte Chemie 72, 781–2 (1960) by S. R. Paulsen. However, such a process is slow and expensive, and occasionally dangerous.

I have discovered a simple one-step process for the preparation of the diazirines of Formula 1 which involves reacting the corresponding carbonyl compound with gaseous ammonia and chlorine at a temperature of from about —25° C. to about 100° C.

The diazirines prepared by my process can be used as a means of converting a carbonyl compound to an olefin, and more important, as chemical blowing agents for such materials as polycaprolactam, polyvinyl chloride, polyethylene, polypropylene, polyurethane, polystyrene, styrene-butadiene rubbers, ethylene/propylene copolymers, ethylene/propylene/hexadiene terpolymers, polychloroprene, and other such polymers as disclosed in my co-pending application, Serial No. 418,260, filed December 14, 1960.

My process can be carried out in the presence or absence of a solvent, although the presence of a solvent is preferred because the rate of reaction is improved by the presence of a solvent.

The solvent suitable for use in my process are those which will enhance the solubility of ammonia in the reaction system. For example, such solvents as petroleum ether, methanol, ethanol, cyclohexanol, butanol, octanol, pentanol and heptanol can be used to advantage.

The amount of solvent used is not critical and can range from none at all up to many times the amount of other reactants. However, generally an amount of from about 20% to 80% based on the weight of carbonyl compound used, seems to be most beneficial to reaction rates.

Since a solvent is used primarily to promote ammonia solubility, the preference for its presence diminishes if the reaction is carried out under pressure. This is due to the increased solubility of ammonia resulting from the increased pressure.

The amount of pressure exerted on the reaction can range from atmospheric up to the limits of the process equipment used. As a practical matter no more than about 10 atmospheres pressure is preferred as it is desirable to have the ammonia and chlorine present in the form of a gas at reaction temperatures.

The reaction can be conducted at temperatures ranging from about —25° C. to about 100° C. However, a maximum temperature of 50 to 60° C. is preferred as higher temperatures of reaction tend to increase liquid carry-over if a distillation is used in the process. A preferred minimum temperature is 0° to —10° C. as the amount of cooling equipment required increases rapidly with lower temperatures.

The ratio of reactants is controlled by the fact that an excess of ammonia to chlorine should be maintained to avoid the formation of nitrogen chloride which is explosive and therefore dangerous. A 3 or 4 to 1 ammonia to chlorine ratio is considered a minimum desirable ratio. Conversely, the ratio of ammonia to chlorine has no upper limit as regards the ability of the reaction to progress, but as a practical matter no advantage is obtained by having a ratio greater than 50 moles of ammonia per mole of chlorine. It is preferred to maintain an ammonia to chlorine ratio below 15 to 1 to avoid a recovery problem with the excess ammonia.

The ratio of ammonia and chlorine to the carbonyl reactant can vary widely, however, a molar excess of ammonia to carbonyl compound will normally be maintained. For maximum reaction efficiency, about 6 moles of ammonia per mole of carbonyl compound is preferred.

An inert gas can be used to dilute the chlorine addition if desired, and the ammonia and chlorine can be introduced separately into the liquid carbonyl compound or they can be mixed in the vapor space above the carbonyl compound.

The carbonyl compounds suitable for use in this process, as mentioned previously, will correspond to the diazirine sought to be prepared. The formula for the carbonyl compounds will therefore be, (2) 

with $R_1$ and $R_2$ representing the same groups as in Formula 1.

These compounds can be obtained from commercial sources or prepared by processes well known in the art, such as by reacting a carboxylic acid chloride with an alkane in the presence of anhydrous aluminum chloride in a modified Friedel-Crafts reaction.

Although the process and its products as disclosed has dealt with carbonyl compounds and diazirines which have unsubstituted side chains, it should be understood that substituted side chains can also be present on the starting carbonyls and resulting diazirines of this invention in the positions designated $R_1$, $R_2$, $R_3$ and $R_4$. For example, such substituents as cyano, alkoxy, halogens, ethers, sulfides, thioalkoxy, hydroxyls, carboxyls, phenoxy, nitro, sulfones, sulfoxides, nitrosoamines, phenyl, cycloalkyl, nitriles, dialkylamines, thioethers, and other such substituents can be present on an alkyl without departing from the concept of this invention. Of the many possible substituents those preferred are the cyano and alkoxy substituents and their presence has been found most preferable on the $R_3$ position alkyl.

The reaction vessel used will be determined by the temperature and pressure to be employed in the reaction. No other limitations exist as to the reactor except that it be equipped with means for introducing the reactants, be of a material which is nonreactive with the reactants, and be equipped with means for agitating the contents. A high speed rotary type of mixer or any equivalent which will give sufficient agitation to obtain intimate gas-liquid contact is satisfactory.

The reaction can be run either batchwise or continuously as will be further illustrated in the examples. During the reaction, by-product ammonium chloride will build up in the reactor and can be filtered off periodically or continuously with the filtrate being recycled to the reactor.

At the conclusion of the reaction, or, if running continuously when the product stream is drawn off, the diazirine can be separated by distillation. If a solvent is used and it has a higher boiling point than the diazirine that is formed, the diazirine can be removed by a lower distillation cut and the remainder of the batch or stream can be recycled to the reactor.

The diazirines prepared by this process can be characterized by any of the methods well known in the art. For example, they may be characterized by ultra-violet absorption in the 320–370 millimicron range or by infrared analysis with an absorption peak at 6.25–6.4 microns. Other well known means of characterization are boiling points and refractive indices.

Particularly preferred products of this invention because of their exceptional utility as blowing agents are the diazirines of the following formula:

(1) 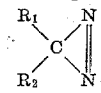

wherein $R_1$ is alkyl of 4 through 16 carbon atoms or phenyl; and $R_2$ is hydrogen, or

wherein $R_3$ is hydrogen or alkyl of 1 through 15 carbon atoms; $R_4$ is hydrogen or methyl; provided that there be no more than 18 carbon atoms in the diazirine.

The most preferred diazirines of this invention are 3-methyl-3-hexyldiazirine and 3-ethyl-3-hexyldiazirine, which have the greatest versatility as regards the types of polymers with which they are suitable for use as blowing agents.

The following examples are given to more fully illustrate the invention and the parts or percentages therein are by weight unless otherwise noted.

*Example 1*

Four hundred grams of octanone-2 and 200 grams of octanol-1 are heated to 50° C. and at this temperature a stream of ammonia (60 liter/hour) and a mixture of chlorine and nitrogen (20 g./hr. chlorine+18 liters/hr. nitrogen) are introduced with good agitation. The ammonium chloride formed is filtered off intermittently and the filtrate returned to the reaction. After 310 gr. of chlorine have been added, the concentration of methylhexyldiazirine is 28.1%. The product is isloated by distillation as a liquid of a B.P. of 44° C. at 10 mm. pressure.

*Example 2*

Seven hundred ml. heptanone-2 are cooled at 5° C. and at this temperature a stream of ammonia (60% liters/hr.) and a mixture of chlorine gas and nitrogen (20 g. chlorine/hr.+18 liters nitrogen/hr.) are introduced with good agitation. Precipitated ammonium chloride is intermittently removed by filtration. After 152 gr. of chlorine have been added, the concentration of methyl-amyl-diazirine is 10.6%. This product is isolated by distillation at 40 mm. pressure. The B.P. of the methyl-amyl-diazirine is 50–51° C. at 40 mm. pressure.

*Example 3*

Seven hundred ml. undecanone-2 and 10 ml. methanol are cooled to 15° C. At a temperature between 10 and 15° C. a stream of ammonia (40 liters/hr.) and a mixture of chlorine gas and nitrogen (13.3 g. chlorine/hr. and 12 liters nitrogen/hr.) are introduced with good agitation. After 70 gr. chlorine have been added, the ammonium chloride is filtered and the filtrate distilled to recover methyl-nonyl-diazirine of a B.P. of 40–41° C./0.3 mm., and unreacted undecanone. 500 ml. of recovered undecanone and 200 ml. of make-up undecanone, along with the mixture containing 1.49% of methyl-nonyl-diaziridine and 4.57% methyl-nonyl-diazirine are treated again as above, at 10–15° C. with a stream of ammonia and chlorine plus nitrogen. After 70 gr. chlorine have been added, the reaction product contains 7.42% diaziridine and 11.9% diazirine. After filtration of $NH_4Cl$, the filtrate is distilled to give an additional amount of methyl-nonyl-diazirine.

*Example 4*

Four hundred gr. methylisobutylketone and 200 gr. octanol-1 are cooled to 5° C. and at this temperature a stream of ammonia (60 liters/hr.) and a mixture of chlorine and nitrogen (20 g. chlorine/hr.+18 liters nitrogen/hr.) are introduced with good agitation. The ammonium chloride is filtered intermittently and the filtrate returned to the reaction. After eight hours of operation, the reaction product is distilled to give methylisobutyldiazirine of a B.P. 40–41° C. at 100 mm. pressure.

*Example 5*

Five hundred gr. of octanol-1 and 100 g. of octanone-2 (16.7 wt. percent ketone in alcohol) are cooled to 6° C. and at this temperature a stream of ammonia (90 liters/hr.) and a mixture of chlorine gas and nitrogen (30 gr. chlorine/hr.+27 liters nitrogen/hr.) are introduced with good agitation and intermittent removal of $NH_4Cl$. After 160 gr. chlorine have been added, the concentration of methyl-hexyl-diazirine is 9.35%. It is isolated by distilling the filtered reaction mixture at 10 mm. pressure.

*Example 6*

A solution of 100 g. of 5-cyanopentanone-2 and 100 g. of n-octanol is stirred and sparged at room temperature with chlorine, ammonia, and nitrogen at the respective rates of 20 g./hr., 95 g./hr., and 40 l./hr. until 102 g. of chlorine is introduced. The mixture is next filtered and the insoluble material is dissolved in water. The organic layer is returned to the filtrate and the combined solution is stirred with 100 ml. of $Na_2SO_3 \cdot 7H_2O$–NaOH solution (25%–5%), washed with water, and dried over $MgSO_4$.

Distillation gives 24.9 g. of n-octanol contaminated 3-[3-cyano]propyl-3-methyldiazirine, boiling point 36–

44° at 0.2 mm. The distillate is stirred with 5 g. of phenylisocyanate for 2 hours, water is added, and the mixture filtered. The organic layer is separated, dried over MgSO$_4$, and distilled, using n-dodecanol as a chaser. This gives 7.5 ml. of 3-[3-cyano]propyl-3-methyldiazirine, boiling point 48–50° at 0.5 mm. The compound shows the charatceristic diazirine band at 1585/cm. in the infrared and absorbs in the ultraviolet at 346 m$\mu$.

Example 7

A solution of 100 g. of n-octanol and 100 g. of 2-methylcyclohexanone is stirred and sparged at room temperature for 4¾ hours with chlorine, ammonia, and nitrogen at the respective rates of 20 g./hr., 95 g./hr., and 40 l./hr. The reaction mixture is next filtrated and the insoluble material is dissolved in water. The organic layer is returned to the filtrate and the combined solution is stirred with 100 ml. of Na$_2$SO$_3$·7H$_2$O–NaOH solution (25%–5%), washed with water, and dried over MgSO$_4$.

Distillation through a spinning-band column gives 10 ml. of 3-[1-methyl]pentamethylenediazirine, boiling point 25° at 25 mm. The compounds shows the charatceristic diazirine band as a doublet at 1575 and 1585/cm. in the infrared and absorbs in the ultraviolet at 352 m$\mu$.

Example 8

A solution of 50 g. of 2-ethylhexanol and 200 g. of n-octanol is stirred vigorously, and while maintaining the temperature in the 10–16° C. range, is sparged with chlorine, ammonia, and nitrogen at the rates of 20 g./hr., 95 g./hr., and 40 l./hr. respectively. Sparging is continued until 47 g. of chlorine is passed in. The reaction mixture is filtered periodically and the insoluble material is dissolved in water while the organic layer which forms is added back to the filtrate. The filtrate is returned to the flask and additional chlorine is sparged in at 0–5° C. A total of 141 g. chlorine is introduced.

After standing overnight the reaction mixture is again filtered and the insoluble material dissolved in water. The organic layer is returned to the filtrate. The combined solution is stirred for a few minutes with 100 ml. of Na$_2$SO$_3$·7H$_2$O–NaOH solution (25–5%), washed with water (2 x 100 ml.), and dried over MgSO$_4$. Distillation through a 36" spinning-band column at 0.25 mm. up to the boiling point of n-octanol gives 21 g. of distillate. The distillate was extracted four times with 7–10 ml. portions of 75:25 (volume) sulfuric acid-water, washed repeatedly with water, and dried over MgSO$_4$. This gives 2.0 g. of 3-[3-heptyl]diazirine which shows the characteristic diazirine infrared band at 1590/cm. and absorbs in the ultraviolet at 333 m$\mu$.

Example 9

A solution of 306 g. 3-nonanone and 294 g. n-octanol is stirred vigorously, and while maintaining the temperature between 20° and 30°, 78 g. of chlorine and 562 g. of ammonia are passed into the solution over 6 hours. The chlorine stream is diluted with nitrogen at the rate of 39 l./hr.

The chlorine addition is continued until 289 g. of chlorine is introduced. The reaction mixture is filtered periodically and the insoluble material dissolved in water. The organic layer which forms is added to the filtrate and the resulting solution returned to the reaction vessel.

After the final filtration the organic solution is stirred for a few minutes with 200 ml. of a solution which is 25% Na$_2$SO$_3$·7H$_2$O and 5% NaOH. After washing twice with 200 ml. of water the solution is dried with Na$_2$SO$_4$ followed by MgSO$_4$.

The 503 g. of yellow solution is then distilled through a helices-packed column until the head temperature reaches 44° at 0.9 mm. pressure. 136.5 g. of the distillate is re-distilled through a 36" spinning-band column to yield 86.6 g. of 3-ethyl-3-hexyldiazirine, of a boiling point of 36–37° at 1.4–1.5 mm. The 3-ethyl-3-hexyldiazirine shows ultraviolet absorbance at 351 m$\mu$ and shows the characteristic diazirine infra-red band at 1585/cm.

Examples 10–11

By substituting molecular equivalent amounts of the following carbonyl compounds for the octanone-2 of Example 1, the corresponding diazirine product is obtained.

| Carbonyl Compound | Diazirine Product |
|---|---|
| 10. pentadecan-8-one | 3,3-diheptyldiazirine. |
| 11. 4,4'-methylenebiscyclohexanone. | 3,3'-methylenebis(3,3-pentamethylenediazirine). |

Examples 12–14

By substituting molecular equivalent amounts of the following carbonyl compounds for the methylisobutylketone of Example 4, the corresponding diazirine product is obtained.

| Carbonyl Compound | Diazirine Product |
|---|---|
| 12. Propiophenone | 3-phenyl-3-ethyldiazirine. |
| 13. Methyl-sec.-butylketone | 3-methyl-3-sec.-butyldiazirine. |
| 14. 3-methyloctan-2-one | 3-methyl-3-(2-methylhexyl)diazirine. |

Examples 15–17

By substituting molecular equivalent amounts of the following carbonyl compounds for the 5-cyanopentanone-2 of Example 6, the corresponding diazirine product is obtained.

| Carbonyl Compound | Diazirine Product |
|---|---|
| 15. 5-methoxypentan-2-one | 3-methyl-3-(3-methoxypropyl)diazirine. |
| 16. 6-cyano-3-methylpentan-2-one | 3-methyl-3-(3-cyano-2-methoxypropyl)diazirine. |
| 17. 5-methoxy-3-methylhexan-2-one. | 3-methyl-3-(3-methoxy-2-methylbutyl)diazirine. |

Examples 18–23

By substituting molecular equivalent amounts of the followingly carbonyl compounds for the 2-methylcyclohexanone of Example 7, the corresponding diazirine product is obtained.

| Carbonyl Compound | Diazirine Product |
|---|---|
| 18. 4-methoxycyclohexanone | 3,3-(3-methoxypentamethylene)diazirine. |
| 19. 4-butoxycyclohexanone | 3,3-(3-butoxypentamethylene)diazirine. |
| 20. Cyclododecanone | 3,3-undecanemethylenediazirine. |
| 21. Cyclobutanone | 3,3-trimethylenediazirine. |
| 22. 3-methylcyclohexanone | 3,3-(2-methylpentamethylene)diazirine. |
| 23. 4-methylcyclohexanone | 3,3-(3-methylpentamethylene)diazirine. |

I claim:
1. A process for the preparation of diazirines of the following formula:

(1)

wherein
R$_1$ is phenyl, unsubstituted alkyl of from 1 through 6 carbon atoms, and alkyl of from 1 through 6 carbon atoms substituted with a substituent selected from the group consisting of cyano and alkoxy of 1 through 4 carbon atoms;
R$_2$ is hydrogen or

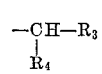

wherein
R₃ is hydrogen, unsubstituted alkyl of from 1 through 6 carbon atoms, and alkyl of from 1 through 6 carbon atoms substituted with a substituent selected from the group consisting of cyano and alkoxy of 1 through 4 carbon atoms;
R₄ is hydrogen or methyl;

provided that R₁ and R₂ can be taken together and are of the following formulae:

(2) 

wherein $n$ is a positive integer greater than 1 and less than 15;

(3) 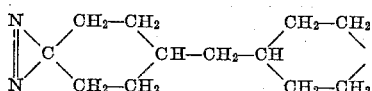

(4) 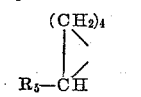

(5) 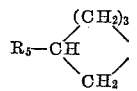

(6) 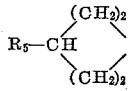

wherein R₅ is alkyl of from 1 through 4 carbon atoms, or alkoxy of 1 through 4 carbon atoms, with the limitation that there will be no more than a total of 18 carbon atoms in the diazirine; said process comprising reacting the corresponding carbonyl compound with gaseous ammonia and chlorine at a temperature of from about −25° C. to about 100° C. to form the corresponding diaziridine and continuing said reaction for a time sufficient to form the diazirine and recovering the diazirine compound thus formed.

2. The process of claim 1 in which the carbonyl compound is cyclohexanone.

3. The process of claim 1 in which the carbonyl compound is 4,4′-methylenebiscyclohexanone.

References Cited by the Examiner
UNITED STATES PATENTS
3,171,834   3/1965   Paulsen _____ 260—239

FOREIGN PATENTS
893,388   4/1962   Great Britain.

ALEX MAZEL, *Primary Examiner.*

HENRY R. JILES, *Examiner.*

ALTON D. ROLLINS, *Assistant Examiner.*